United States Patent
Liu

(10) Patent No.: US 11,178,703 B2
(45) Date of Patent: Nov. 16, 2021

(54) COMMUNICATION METHOD AND COMMUNICATIONS DEVICE

(71) Applicant: HUAWEI TECHNOLOGIES CO., LTD., Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 16/785,018

(22) Filed: Feb. 7, 2020

(65) Prior Publication Data

US 2020/0178314 A1    Jun. 4, 2020

Related U.S. Application Data

(63) Continuation of application No. PCT/CN2018/099889, filed on Aug. 10, 2018.

(30) Foreign Application Priority Data

Aug. 10, 2017  (CN) .......................... 201710682502.0

(51) Int. Cl.
*H04W 74/08*  (2009.01)
*H04W 72/04*  (2009.01)

(52) U.S. Cl.
CPC ... *H04W 74/0833* (2013.01); *H04W 72/0446* (2013.01); *H04W 72/0453* (2013.01); *H04W 72/0466* (2013.01)

(58) Field of Classification Search
CPC ......... H04W 74/0833; H04W 72/0466; H04W 72/0453; H04W 72/0446
See application file for complete search history.

(56) References Cited

U.S. PATENT DOCUMENTS

2014/0301330 A1* 10/2014 Lee .................. H04W 74/0833
                                                                370/329
2016/0330766 A1* 11/2016 Liu .................. H04W 72/0446
(Continued)

FOREIGN PATENT DOCUMENTS

CN        102238754 A      11/2011
CN        103597765 A       2/2014
(Continued)

OTHER PUBLICATIONS

3GPP TSG-RAN WG2 Meeting #93, R2-161134, ZTE:"Open issues on eMTC random access procedure", St. Julians, Malta, Feb. 15-19, 2016, total 6 pages.
(Continued)

*Primary Examiner* — Brian D Nguyen
(74) *Attorney, Agent, or Firm* — Leydig, Voit & Mayer, Ltd.

(57) ABSTRACT

This application provides a communication method and a communications device. The method includes: after a terminal sends a first preamble to a network device, determining, by both the terminal and the network device, a scramble value of a first RAR according to an $i^{th}$ time unit, a first frequency domain resource, and a maximum RAR time window length, where the $i^{th}$ time unit is a first time unit corresponding to a first time domain resource, the maximum time window length includes M time units, and M equals to an integer multiple of a quantity of time units included in a system frame of each system parameter in a plurality of system parameters for communication between the terminal and the network device. Therefore, RAR detection accuracy may be improved.

21 Claims, 4 Drawing Sheets

(56) References Cited

U.S. PATENT DOCUMENTS

| | | | | |
|---|---|---|---|---|
| 2017/0026102 A1* | 1/2017 | Guo | ........................ | H04B 7/063 |
| 2017/0215207 A1 | 7/2017 | Yi et al. | | |
| 2018/0302921 A1* | 10/2018 | Wang | ..................... | H04W 74/08 |
| 2020/0245200 A1* | 7/2020 | Xiong | ................... | H04B 7/0626 |
| 2020/0245361 A1* | 7/2020 | Xiong | ................. | H04W 74/008 |

FOREIGN PATENT DOCUMENTS

| | | |
|---|---|---|
| CN | 106559905 A | 4/2017 |
| CN | 106973441 A | 7/2017 |
| JP | 2018528677 A | 9/2018 |
| WO | 2017052144 A1 | 3/2017 |
| WO | 2018226026 A1 | 12/2018 |

OTHER PUBLICATIONS

3GPP TS 36.321, V14.3.0,3rd Generation Partnership Project;Technical Specification Group Radio Access Network; Evolved Universal Terrestrial Radio Access (E-UTRA); Medium Access Control (MAC) protocol specification (Release 14) ,Jun. 23, 2017 (Jun. 23, 2017), pp. 1-107, XP051299019.

Huawei,"RAR reception for eMTC",3GPP TSG RAN WG2 Meeting #98 R2-1706106,Hangzhou, P.R. China, May 15-19, 2017,Total 4 Pages.

Samsung et al.,"WF on multiple Msg.1 transmission for contention free case",3GPP TSG RAN WG1 NR Ad-Hoc#2 R1-1711876 Qingdao, P.R. China Jun. 27-30, 2017,total 3 pages.

Ericsson: Multiple Preamble Transmissions in NR Random Access, 3GPP Draft; R2-1707131 Jun. 16, 2017 (Jun. 16, 2017), XP051306840,total 8 pages.

Ericsson,"Text proposal on RA-RNTI calculation for Rel-13 LC CE UEs",3GPP TSG-RAN WG2 #93 Tdoc R2-161776, St. Julian s, Malta, Feb. 15-19, 2016,Total 2 Pages.

3GPP TS 38.211 V0.1.0 (Jun. 2017);3rd Generation Partnership Project;Technical Specification Group Radio Access Network;NR;Physical channels and modulation(Release 15);total 22 pages.

3GPP TS 38.321 V0.2.0 (Aug. 2017);3rd Generation Partnership Project;Technical Specification Group Radio Access Network;NR;Medium Access Control (MAC) protocol specification(Release 15);total 36 pages.

"Discussion on increasing RAR window for eMTC," 3GPP TSG-RAN2 Meeting #97bis, Spokane, Washington, USA, R2-1703314, pp. 1-2, 3rd Generation Partnership Project, Valbonne, France (Apr. 3-7, 2017).

"4-step random access procedure," 3GPP TSG-RAN WG1 NR Ad-Hoc#2, Qingdao, China, R1-1711383, pp. 1-17, 3rd Generation Partnership Project, Valbonne, France (Jun. 27-30, 2017).

* cited by examiner

COMMUNICATION METHOD AND COMMUNICATIONS DEVICE

CROSS-REFERENCE TO RELATED APPLICATIONS

This application is a continuation of International Application No. PCT/CN2018/099889, filed on Aug. 10, 2018, which claims priority to Chinese Patent Application No. 201710682502.0, filed on Aug. 10, 2017. The disclosures of the aforementioned applications are hereby incorporated by reference in their entireties.

TECHNICAL FIELD

Embodiments of this application relate to the field of communications technologies, and in particular, to a communication method and a communications device.

BACKGROUND

Contention-based random access is a random access procedure randomly initiated by a terminal when an evolved NodeB (eNodeB, eNB) does not allocate a dedicated resource to the terminal. The terminal is also referred to as user equipment (User Equipment, UE). A contention-based random access procedure is implemented in four steps: A terminal sends a preamble (Msg1) to a base station; the base station sends a random access response (Random Access Response, RAR) (Msg2) to the terminal according to the received preamble; then, the terminal and the base station perform uplink scheduling transmission (in other words, transmit an Msg3) for the first time; and finally, the base station feeds back contention resolution (Msg4) to the terminal. Specifically, a process of sending the RAR to the terminal by the base station is as follows: The base station determines a random access radio network temporary identifier (Random Access Radio Network Temporary Identifier, RA-RNTI) according to a PRACH time-frequency resource location at which the preamble is sent; then, uses the RA-RNTI to scramble the RAR; and sends a scrambled RAR to the terminal. Correspondingly, the terminal determines the RA-RNTI according to the PRACH time-frequency resource location at which the terminal sends the preamble, and then obtains the RAR according to the RA-RNTI. Therefore, to obtain the correct RAR, the terminal needs to obtain an RA-RNTI that is the same as the RA-RNTI at the base station. Currently, the terminal and the base station determine the RA-RNTI mainly according to an absolute time index that is used to represent a PRACH time-frequency resource location, for example, a subframe number or a system frame number. If the UE supports configuration of a plurality of RACH resources at different RACH transmission moments, before an RAR detection window ends, the user equipment may send a preamble at a plurality of configured RACH time-frequency resource locations. However, when a subcarrier spacing is relatively large, for example, 60 kHz, one subframe may include a plurality of RACH resources at different transmission moments but at a same frequency domain location. For this reason, when the base station and the terminal determine the RA-RNTI, a same RA-RNTI is determined according to different RACH time-frequency resource locations in a same subframe. Therefore, the terminal cannot distinguish a RACH resource corresponding to the received RAR, causing much ambiguity of RAR detection.

SUMMARY

Embodiments of this application provide a communication method and a communications device, to improve RAR detection accuracy.

According to a first aspect, an embodiment of this application provides a communication method, including:

sending, by a first communications device, a first preamble to a second communications device, where the first preamble occupies a first time domain resource and a first frequency domain resource, and a first time unit corresponding to the first time domain resource is an $i^{th}$ time unit;

determining, by the first communications device, a scramble value of a first RAR according to the $i^{th}$ time unit, the first frequency domain resource, and a maximum RAR time window length, where the first RAR is an RAR corresponding to the first preamble, the maximum time window length includes M time units, and M equals to an integer multiple of a quantity of time units in one system frame of each system parameter in a plurality of system parameters for communication between the first communications device and the second communications device; and receiving, by the first communications device in a time window of the RAR according to the scramble value of the first RAR, the first RAR from the second communications device, where a length of the time window of the RAR is less than or equal to the maximum time window length.

In a possible design, the method further includes:

receiving, by the first communications device, information from the second communications device about the length of the time window of the RAR.

In a possible design, the time unit is a time interval for data transmission between the first communications device and the second communications device or a slot.

In a possible design, the determining, by the first communications device, a scramble value of a first RAR according to the $i^{th}$ time unit, the first frequency domain resource, and a maximum RAR time window length includes:

determining, by the first communications device, the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

In a possible design, the determining, by the first communications device, the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located includes:

determining, by the first communications device, the scramble value of the first RAR according to Formula 1, where Formula 1 is as follows:

$$RA\text{-}RNTI = 1 + i + N_{frame} \times f\_id + F_{max} \times N_{frame}(SFN\_id \bmod(W_{max}/N_{frame}))$$

where RA-RNTI is the scramble value of the first RAR, i represents the index number of the first time unit corresponding to the first time domain resource of the current system parameter, $N_{frame}$ represents the quantity of time units in a system frame of the current system parameter, $F_{max}$ is the maximum quantity of candidate frequency domain resources that are in one of the time units and that are of the first preamble, f_id represents an index number of a candidate frequency domain resource corresponding to the first frequency domain resource, SFN_id represents the index number of the first system frame in which the first time domain resource is located, and $W_{max}$ represents the maximum time window length.

In a possible design, the determining, by the first communications device, a scramble value of a first RAR according to the $i^{th}$ time unit, the first frequency domain resource, and a maximum RAR time window length includes:

determining, by the first communications device, the scramble value of the first RAR according to at least one of the following: an index number of the $i^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

In a possible design, the determining, by the first communications device, the scramble value of the first RAR according to at least one of the following: an index number of the $i^{th}$ time unit, the first frequency domain resource, the maximum RAR time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units included in a system frame of the current system parameter, and an index number of a first system frame in which the first time domain resource is located includes:

determining, by the first communications device, the scramble value of the first RAR according to Formula 2, where Formula 2 is as follows:

$$\text{RA-RNTI} = 1 + i + S_{reference} \times N_{scs}/N_{reference} \times f\_id + F_{max} \times S_{reference}(\text{SFN\_id} \bmod (W_{max}/N_{frame}))$$

where RA-RNTI is the scramble value of the first RAR, i represents the index number of the first time unit corresponding to the first time domain resource of the current system parameter, $S_{reference}$ represents the quantity of time units in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

In a possible design, the first preamble is any one of K preambles that need to be sent by the first communications device to the second communications device, where the first preamble is a $T^{th}$ preamble in the preambles, and $1 \leq T \leq K$; and the index number of the first time unit corresponding to the first time domain resource is $i_T$, where a value of $i_T$ varies with a value of T, and the first frequency domain resource is a $(j_T)^{th}$ frequency domain resource;

a start time unit of the time window of the RAR is related to an index number $i_1$ of a first time unit corresponding to a first preamble in the preambles; and/or an end time unit of the time window of the RAR is related to an index number $i_K$ of a first time unit corresponding to a $K^{th}$ preamble in the preambles.

In a possible design, the method further includes:

if the first communications device successfully receives the first RAR according to the scramble value of the first RAR, sending, by the first communications device, a random access message 3 to the second communications device, and stopping sending unsent preambles in the K preambles to the second communications device.

According to a second aspect, an embodiment of this application provides a communication method, including:

receiving, by a second communications device, a first preamble from a first communications device, where the first preamble occupies a first time domain resource and a first frequency domain resource, and a first time unit corresponding to the first time domain resource is an $i^{th}$ time unit;

determining, by the second communications device, a scramble value of a first RAR according to the $i^{th}$ time unit, the first frequency domain resource, and a maximum RAR time window length, where the first RAR is an RAR corresponding to the first preamble, the maximum time window length includes M time units, and M equals to an integer multiple of a quantity of time units in a system frame of each system parameter in a plurality of system parameters for communication between the first communications device and the second communications device; and sending, by the second communications device, the first RAR to the first communications device in a time window of the RAR according to the scramble value of the first RAR, where a length of the time window of the RAR is less than or equal to the maximum time window length.

In a possible design, the method further includes:

sending, by the second communications device, information about the length of the time window of the RAR to the first communications device.

In a possible design, the time unit is a time interval for data transmission between the first communications device and the second communications device or a slot.

In a possible design, the determining, by the second communications device, a scramble value of a first RAR according to the $i^{th}$ time unit, the first frequency domain resource, and a maximum RAR time window length includes:

determining, by the second communications device, the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

In a possible design, the determining, by the second communications device, the scramble value of the first RAR according to at least one of the following: an index number of the i$^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located includes:

determining, by the second communications device, the scramble value of the first RAR according to Formula 1, where Formula 1 is as follows:

$$RA\text{-}RNTI = 1 + i + N_{frame} \times f\_id + F_{max} \times N_{frame}(SFN\_id \bmod(W_{max}/N_{frame}))$$

where RA-RNTI is the scramble value of the first RAR, i represents the index number of the first time unit corresponding to the first time domain resource of the current system parameter, $N_{frame}$ represents the quantity of time units in a system frame of the current system parameter, $F_{max}$ is the maximum quantity of candidate frequency domain resources that are in one of the time units and that are of the first preamble, f_id represents an index number of a candidate frequency domain resource corresponding to the first frequency domain resource, SFN_id represents the index number of the first system frame in which the first time domain resource is located, and $W_{max}$ represents the maximum time window length.

In a possible design, the determining, by the second communications device, a scramble value of a first RAR according to the i$^{th}$ time unit, the first frequency domain resource, and a maximum RAR time window length includes:

determining, by the second communications device, the scramble value of the first RAR according to at least one of the following: an index number of the i$^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

In a possible design, the determining, by the second communications device, the scramble value of the first RAR according to at least one of the following: an index number of the i$^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located includes:

determining, by the second communications device, the scramble value of the first RAR according to Formula 2, where Formula 2 is as follows:

$$RA\text{-}RNTI = 1 + i + S_{reference} = N_{scs}/N_{reference} \times f\_id + F_{max} \times S_{reference}(SFN\_id \bmod(W_{max}/N_{frame}))$$

where RA-RNTI is the scramble value of the first RAR, i represents the index number of the first time unit corresponding to the first time domain resource of the current system parameter, $S_{reference}$ represents the quantity of time units in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units included in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

In a possible design, the first preamble is any one of K preambles that need to be sent by the second communications device to the first communications device, where the first preamble is a T$^{th}$ preamble in the preambles, and 1≤T≤K; and the index number of the first time unit corresponding to the first time domain resource is $i_T$, where a value of $i_T$ varies with a value of T, and the first time domain resource is a $(j_T)^{th}$ frequency domain resource;

a start time unit of the time window of the RAR is related to an index number $i_1$ of a first time unit corresponding to a first preamble in the preambles; and/or an end time unit of the time window of the RAR is related to an index number $i_K$ of a first time unit corresponding to a K$^{th}$ preamble in the preambles.

In a possible design, the method further includes:

receiving, by the second communications device, a random access message 3 from the first communications device; and releasing, by the second communications device according to the random access message 3, a random access resource occupied by unsent preambles in the K preambles, or allocating, by the second communications device according to the random access message 3, a random access resource occupied by unsent preambles in the K preambles to another communications device.

According to a third aspect, an embodiment of this application provides a communications device used as a first communications device, including: a sending module, configured to send a first preamble to a second communications device, where the first preamble occupies a first time domain resource and a first frequency domain resource, and a first time unit corresponding to the first time domain resource is an i$^{th}$ time unit;

a processing module, configured to determine a scramble value of a first RAR according to the i$^{th}$ time unit, the first frequency domain resource, and a maximum RAR time window length, where the first RAR is an RAR corresponding to the first preamble, the maximum time window length includes M time units, and M equals to an integer multiple of a quantity of time units in a system frame of each system parameter in a plurality of system parameters for communication between the first communications device and the second communications device; and a receiving module, configured to receive, in a time window of the RAR according to the scramble value of the first RAR, the first RAR from the second communications device, where a length of the time window of the RAR is less than or equal to the maximum time window length.

In a possible design, the receiving module is further configured to receive information from the second communications device about the length of the time window of the RAR.

In a possible design, the time unit is a time interval for data transmission between the first communications device and the second communications device or a slot.

In a possible design, the processing module is specifically configured to determine the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

In a possible design, the processing module is specifically configured to determine the scramble value of the first RAR according to Formula 1, where Formula 1 is as follows:

$$\text{RA-RNTI} = 1 + i + N_{frame} \times f\_id + F_{max} \times N_{frame}(\text{SFN\_id} \bmod(W_{max}/N_{frame}))$$

where RA-RNTI is the scramble value of the first RAR, $i$ represents the index number of the first time unit corresponding to the first time domain resource of the current system parameter, $N_{frame}$ represents the quantity of time units in a system frame of the current system parameter, $F_{max}$ is the maximum quantity of candidate frequency domain resources that are in one of the time units and that are of the first preamble, f_id represents an index number of a candidate frequency domain resource corresponding to the first frequency domain resource, SFN_id represents the index number of the first system frame in which the first time domain resource is located, and $W_{max}$ represents the maximum time window length.

In a possible design, the processing module is specifically configured to determine the scramble value of the first RAR according to at least one of the following: an index number of the $i^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

In a possible design, the processing module is specifically configured to determine the scramble value of the first RAR according to Formula 2, where Formula 2 is as follows:

$$\text{RA-RNTI} = 1 + i + S_{reference} \times N_{scs}/N_{reference} \times f\_id + F_{max} \times S_{reference}(\text{SFN\_id} \bmod(W_{max}/N_{frame}))$$

where RA-RNTI is the scramble value of the first RAR, $i$ represents the index number of the first time unit corresponding to the first time domain resource of the current system parameter, $S_{reference}$ represents the quantity of time units in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

In a possible design, the first preamble is any one of K preambles that need to be sent by the first communications device to the second communications device, where the first preamble is a $T^{th}$ preamble in the preambles, and $1 \leq T \leq K$; and the index number of the first time unit corresponding to the first time domain resource is $i_T$, where a value of $i_T$ varies with a value of T, and the first frequency domain resource is a $(j_T)^{th}$ frequency domain resource;

a start time unit of the time window of the RAR is related to an index number $i_1$ of a first time unit corresponding to a first preamble in the preambles; and/or an end time unit of the time window of the RAR is related to an index number $i_K$ of a first time unit corresponding to a $K^{th}$ preamble in the preambles.

In a possible design, the sending module is further configured to: if the receiving module successfully receives the first RAR according to the scramble value of the first RAR, send a random access message 3 to the second communications device, and stop sending unsent preambles in the K preambles to the second communications device.

It should be noted that the communications device in the third aspect may be a terminal or a chip in a terminal.

According to a fourth aspect, an embodiment of this application provides a communications device used as a second communications device, including:

a receiving module, configured to receive a first preamble from a first communications device, where the first preamble occupies a first time domain resource and a first frequency domain resource, and a first time unit corresponding to the first time domain resource is an $i^{th}$ time unit;

a processing module, configured to determine a scramble value of a first RAR according to the $i^{th}$ time unit, the first frequency domain resource, and a maximum RAR time window length, where the first RAR is an RAR corresponding to the first preamble, the maximum time window length includes M time units, and M equals to an integer multiple of a quantity of time units in a system frame of each system parameter in a plurality of system parameters for communication between the first communications device and the second communications device; and a sending module, configured to send the first RAR to the first communications device in a time window of the RAR according to the scramble value of the first RAR, where a length of the time window of the RAR is less than or equal to the maximum time window length.

In a possible design, the sending module is further configured to send information about the length of the time window of the RAR to the first communications device.

In a possible design, the time unit is a time interval for data transmission between the first communications device and the second communications device or a slot.

In a possible design, the processing module is specifically configured to determine the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

In a possible design, the processing module is specifically configured to determine the scramble value of the first RAR according to Formula 1, where Formula 1 is as follows:

$$RA\text{-}RNTI=1+i+N_{frame}\times f\_id+F_{max}\times N_{frame}(SFN\_id \bmod(W_{max}/N_{frame}))$$

where RA-RNTI is the scramble value of the first RAR, i represents the index number of the first time unit corresponding to the first time domain resource of the current system parameter, $N_{frame}$ represents the quantity of time units in a system frame of the current system parameter, $F_{max}$ is the maximum quantity of candidate frequency domain resources that are in one of the time units and that are of the first preamble, f_id represents an index number of a candidate frequency domain resource corresponding to the first frequency domain resource, SFN_id represents the index number of first system frame in which the first time domain resource is located, and $W_{max}$ represents the maximum time window length.

In a possible design, the processing module is specifically configured to determine the scramble value of the first RAR according to at least one of the following: an index number of the $i^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

In a possible design, the processing module is specifically configured to determine the scramble value of the first RAR according to Formula 2, where Formula 2 is as follows:

$$RA\text{-}RNTI=1+i+S_{reference}\times N_{scs}/N_{reference}\times f\_id+F_{max}\times S_{reference}(SFN\_id \bmod(W_{max}/N_{frame}))$$

where RA-RNTI is the scramble value of the first RAR, i represents the index number of the first time unit corresponding to the first time domain resource of the current system parameter, $S_{reference}$ represents the quantity of time units in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

In a possible design, the first preamble is any one of K preambles that need to be sent by the second communications device to the first communications device, where the first preamble is a $T^{th}$ preamble in the preambles, and $1 \leq T \leq K$; and the index number of the first time unit corresponding to the first time domain resource is $i_T$, where a value of $i_T$ varies with a value of T, and the first time domain resource is a $(j_T)^{th}$ frequency domain resource;

a start time unit of the time window of the RAR is related to an index number $i_1$ of a first time unit corresponding to a first preamble in the preambles; and/or an end time unit of the time window of the RAR is related to an index number $i_K$ of a first time unit corresponding to a $K^{th}$ preamble in the preambles.

In a possible design, the receiving module is further configured to receive a random access message 3 from the first communications device; and the processing module is further configured to: according to the random access message 3, release a random access resource occupied by unsent preambles in the K preambles, or allocate a random access resource occupied by unsent preambles in the K preambles to another communications device.

It should be noted that the communications device in the fourth aspect may be a network device or a chip in a network device.

According to a fifth aspect, an embodiment of this application provides a communications device used as a first communications device, including: a processor and a transceiver, where the processor and the transceiver are configured to perform the communication method according to any embodiment of this application in the first aspect.

According to a sixth aspect, an embodiment of this application provides a communications device used as a second communications device, including: a processor and a transceiver, where the processor and the transceiver are configured to perform the communication method according to any embodiment of this application in the second aspect.

According to a seventh aspect, an embodiment of this application provides a storage medium, including a readable storage medium and a computer program, where the computer program is configured to implement the communication method according to the first aspect of this application.

According to an eighth aspect, an embodiment of this application provides a storage medium, including a readable storage medium and a computer program, where the computer program is configured to implement the communication method according to the second aspect of this application.

According to a ninth aspect, an embodiment of this application provides a program product. The program product includes a computer program, the computer program is stored in a readable storage medium, at least one processor of a first communications device may read the computer program from the readable storage medium, and the at least one processor executes the computer program so that the communications device implements the communication method according to the first aspect of this application.

According to a tenth aspect, an embodiment of this application provides a program product. The program product includes a computer program, the computer program is stored in a readable storage medium, at least one processor of a second communications device may read the computer program from the readable storage medium, and the at least one processor executes the computer program so that the communications device implements the communication method according to the second aspect of this application.

The embodiments of this application provide the communication method and the communications device. After the terminal sends the first preamble to the network device, both the terminal and the network device determine the scramble value of the first RAR according to the $i^{th}$ time unit, the first frequency domain resource, and the maximum RAR time window length, where the first time unit corresponding to the first time domain resource is the $i^{th}$ time unit, the maximum time window length includes M time units, and M equals to an integer multiple of a quantity of time units in a system frame of each system parameter in a plurality of system parameters for communication between the terminal and the network device, in other words, a plurality of different system parameters use a same maximum time window length value. Herein, when time units corresponding to different system parameters are used as measurement units, values of the maximum time window length are the same. However, absolute duration of maximum time window lengths of different system parameters may vary. Therefore, even if the terminal sends preambles of a plurality of system parameters to the network device, the terminal determines different scramble values of RARs for these different preambles. Therefore, after receiving the RARs correctly according to the different scramble values, the terminal can accurately distinguish a preamble and a RACH resource that correspond to the RAR, thereby improving RAR detection accuracy.

DESCRIPTION OF EMBODIMENTS

Figure 1:
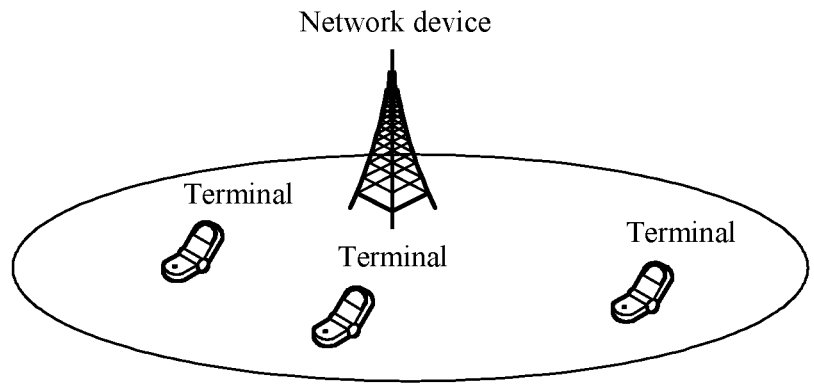
FIG. 1 is a schematic diagram of a communications system according to an embodiment of this application.

FIG. 1 is a schematic diagram of a communications system according to an embodiment of this application. As shown in FIG. 1, the communications system includes a network device and at least one terminal. The network device and the at least one terminal communicate with each other according to technical solutions provided in the following embodiments of this application.

In the following, some terms in this application are described, so as to help a person skilled in the art have a better understanding.

The network device, also referred to as a radio access network (Radio Access Network, RAN) device, is a device that connects a terminal to a wireless network, and may be an evolved NodeB (Evolutional Node B, eNB or eNodeB) in long term evolution (Long Term Evolution, LTE), a relay station or an access point, or a base station in a 5G network, such as a transmission reception point (Transmission and Reception Point, TRP), or a controller. No limitation is imposed herein.

The terminal may be a wireless terminal or may be a wired terminal. The wireless terminal may be a device having a wireless transceiver function, and may be deployed on the land (for example, an indoor or outdoor device, a hand-held device, or an in-vehicle device), or may be deployed on the water (for example, a ship), or may be deployed in the sky (for example, an airplane, a balloon, or a satellite). The terminal may be a mobile phone (mobile phone), a tablet computer (Pad), a computer having a wireless transceiver function, a virtual reality (Virtual Reality, VR) terminal, an augmented reality (Augmented Reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in smart home (smart home), or the like. No limitation is imposed herein.

Figure 2:
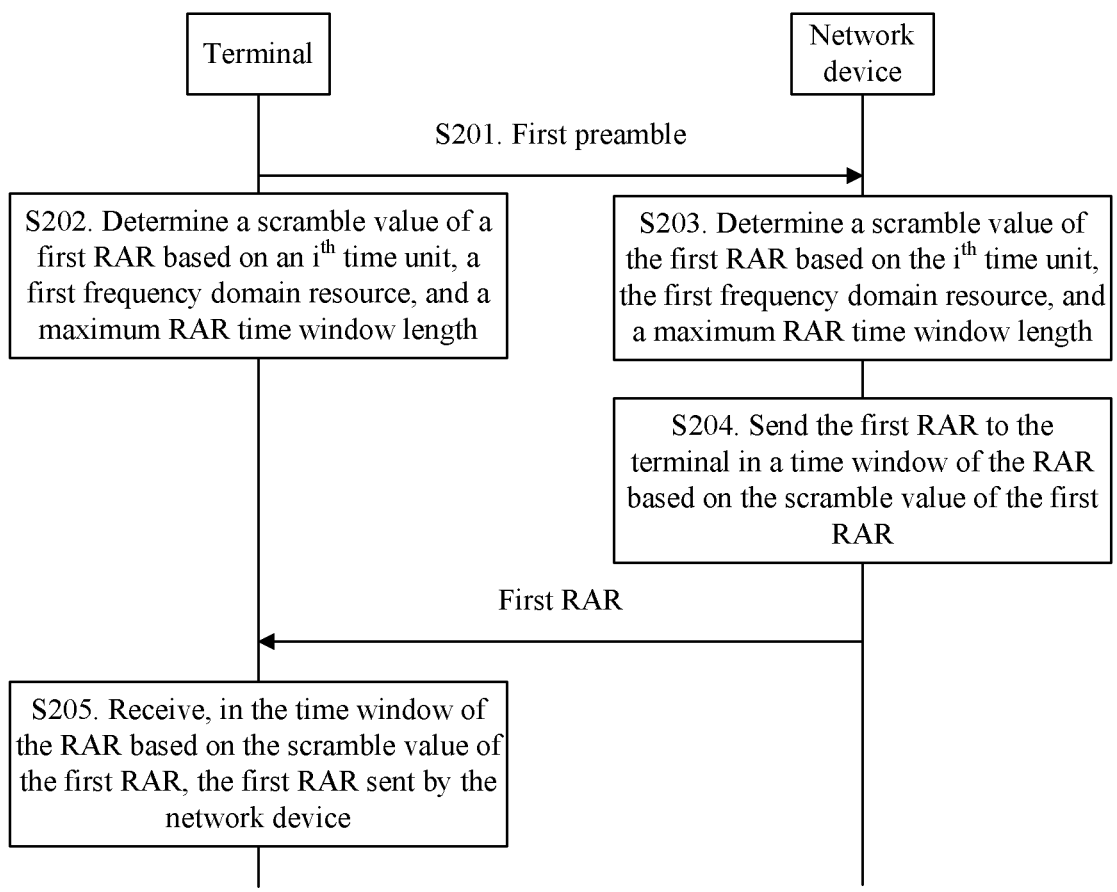
FIG. 2 is a flowchart of a communication method according to an embodiment of this application.

FIG. 2 is a flowchart of a communication method according to an embodiment of this application. As shown in FIG. 2, the method in this embodiment may include the following steps.

S201. A terminal sends a first preamble to a network device.

In this embodiment, the terminal needs to initiate random access to the network device. Therefore, the terminal sends the first preamble to the network device. In some embodiments, in a process of initiating random access to the network device, the terminal needs to send a plurality of preambles to the network device. The first preamble may be any one of the plurality of preambles, and the first preamble may be a random access preamble signal that is from the terminal in the first step of the random access procedure. The first preamble occupies a time domain resource and a frequency domain resource. The time domain resource occupied by the first preamble is referred to as a first time domain resource. The frequency domain resource occupied by the first preamble is referred to as a first frequency domain resource. The first time domain resource may correspond to one or more time units. It is assumed that a first time unit corresponding to the first time domain resource is an $i^{th}$ time unit, in other words, an index number of the first time unit is i.

For example, the first time unit corresponding to the first time domain resource is the $i^{th}$ time unit, and duration of a time unit is unequal to duration of a subframe. To be specific, each system frame is divided into a plurality of time units, for example, a system frame may be divided into A time units, and the system frame may be divided into B subframes. Because duration of a time unit is unequal to duration of a subframe, A is unequal to B. In this embodiment, the time domain resource occupied by the preamble from the terminal to the network device is no longer represented by a subframe. In some embodiments, the duration of the time unit may be equal to duration of a subframe.

Correspondingly, the network device receives the first preamble from the terminal.

S202. The terminal determines a scramble value of a first RAR according to information of the $i^{th}$ time unit, information of the first frequency domain resource, and a maximum RAR time window length.

In this embodiment, the terminal determines the scramble value of the first RAR according to information of the $i^{th}$ time unit, information of the first frequency domain resource, and the maximum RAR time window length. The first RAR herein is an RAR corresponding to the first preamble. Generally, the terminal receives an RAR in a length of a time window of the RAR. The length of the time window of the RAR needs to be less than or equal to the maximum RAR time window length. In this embodiment, for example, a system frame is divided into a plurality of time units. The maximum RAR time window length includes M time units, in other words, duration of the M time units equals to the maximum time window length.

M equals to an integer multiple of a quantity of time units in a system frame of each system parameter in a plurality of system parameters (for example, also referred to as a plurality of pieces of numerology) of the terminal and the network device. Alternatively, M may be equal to a common multiple of a quantity of time units in a system frame of each system parameter in a plurality of system parameters (for example, also referred to as a plurality of pieces of numerology) of the terminal and the network device. For example, when a quantity of time units in one system frame of a system parameter (numerology) corresponding to 15 kHz is 10, a quantity of time units in one system frame of a system parameter (numerology) corresponding to 30 kHz is 20, a quantity of time units included in one system frame of a system parameter (numerology) corresponding to 60 kHz is 40, and a quantity of time units included in one system frame of a system parameter (numerology) corresponding to 120 kHz is 80. Therefore, when a set of system parameters (numerology) that can be supported by a RACH in a system is {15, 30, 60, 120} kHz, if a length of a current preamble is 127 or 139, a system parameter (numerology) that can be supported by the RACH is any one of the foregoing four types, and the maximum RAR time window length equals to a×80 time units, where a is a natural number greater than or equal to 1. The maximum RAR time window length may be any one of integer multiples of 80 that are predefined in a standard. Herein, the system parameter (numerology) that can be supported by the RACH in the system may be alternatively any one in a greater set, for example, {1.25, 5, 7.5, 15, 30, 60, 120, 240} kHz.

A length of a time unit of each system parameter in the plurality of system parameters may vary.

S203. The network device determines a scramble value of the first RAR according to information of the $i^{th}$ time unit, information of the first frequency domain resource, and a maximum RAR time window length.

In this embodiment, the network device determines the scramble value of the first RAR according to the first time unit (namely, the $i^{th}$ time unit) corresponding to the first time domain resource occupied by the received first preamble, the first frequency domain resource, and the maximum RAR time window length. The maximum RAR time window length is similar to the maximum RAR time window length on the terminal side. For details, refer to the foregoing descriptions. Details are not described herein again.

There is no order for performing S202 and S203.

S204. The network device sends the first RAR to the terminal in a time window of the RAR according to the scramble value of the first RAR.

In this embodiment, the network device sends the first RAR to the terminal in the time window of the RAR according to the scramble value of the first RAR. The first RAR is an RAR corresponding to the first preamble. For example, the network device scrambles the first RAR according to the determined scramble value of the first RAR, and then sends scrambled RAR information to the terminal in the time window of the RAR. In this embodiment, a length of the time window of the RAR corresponding to the RAR from the network device to the terminal is less than or equal to the maximum time window length.

In S203 and S204, the scramble value of the first RAR is determined according to information of the first time domain resource, information of the first frequency domain resource, and the maximum RAR time window length. Therefore, the scramble value of the first RAR determined in S203 and the scramble value of the first RAR determined in S204 are the same.

S205. The terminal receives, in the time window of the RAR according to the scramble value of the first RAR, the first RAR from the network device.

In this embodiment, the terminal receives, in the time window of the RAR according to the determined scramble value of the first RAR, the first RAR from the network device. For example, the terminal receives, in the time window of the RAR, information from the network device, where the information is scrambled RAR information. Then, the terminal descrambles the received information according to the determined scramble value of the first RAR, so as to correctly obtain the first RAR.

In this embodiment, after the terminal sends the first preamble to the network device, both the terminal and the network device determine the scramble value of the first RAR according to information of the $i^{th}$ time unit, information of the first frequency domain resource, and the maximum RAR time window length, where the first time unit corresponding to the first time domain resource is the $i^{th}$ time unit, the maximum time window length includes M time units, and M equals to an integer multiple of a quantity of time units in a system frame of each system parameter in a plurality of system parameters for communication between the terminal and the network device, in other words, a plurality of different system parameters use a same maximum time window length value. Herein, when time units corresponding to different system parameters are used as measurement units, values of the maximum time window length are the same. However, absolute duration of maximum time window lengths of different system parameters may vary. Therefore, even if the terminal sends preambles of a plurality of system parameters to the network device, the terminal determines different scramble values of RARs for these different preambles. Therefore, after receiving the RARs correctly according to the different scramble values, the terminal can accurately distinguish a preamble and a RACH resource that correspond to the RAR, thereby improving RAR detection accuracy.

In some embodiments, the network device sends information about the length of the time window of the RAR to the terminal. Correspondingly, the terminal receives the information about the length of the time window of the RAR. Specifically, in this embodiment, the length of the time window of the RAR is determined by the network device, and the length of the time window of the RAR that is determined by the network device is less than or equal to the maximum time window length. Then, the network device sends the determined information about the length of the time window of the RAR to the terminal. In some embodiments, if the terminal sends a plurality of preambles to the network device, RARs corresponding to these preambles share a same RAR time window. Therefore, in one random access procedure, after sending a first preamble to the network device, the terminal receives a length, from the network device, of the time window of the RAR. To be specific, when the terminal sends a plurality of preambles to the network device, a start location of a time window of an RAR corresponding to each of these preambles is a $k^{th}$ subframe after the first preamble, where k is a positive integer greater than or equal to 1, and a specific value of k is related to a processing capability of the network device and/or the terminal. Alternatively, a value of K is notified by the network device to the terminal device by using system information or a broadcast channel.

The information about the length of the time window of the RAR may be allocated by the network device to the terminal by using system information. For example, the network device sends minimum system information or a physical broadcast channel that carries the window length information to the terminal.

A measurement unit of the maximum RAR time window length is a time unit, in other words, the maximum RAR time window length is M time units. A measurement unit of the length of the time window of the RAR may also be a time unit, in other words, the length of the time window of the RAR is N time units, where N≤M.

In some embodiments, the foregoing time unit is a time interval for data transmission between the first communications device and the second communications device. Alternatively, the foregoing time unit is a slot (slot). In other words, in this embodiment, the first time domain resource is no longer represented by subframes occupied by the preamble, but the first time domain resource is represented by slots occupied by the preamble. Therefore, when a plurality of preambles occupy a same subframe, because one subframe includes a plurality of slots and different preambles occupy different slots, the terminal in this embodiment obtains a scramble value of an RAR by using a time domain resource represented by a slot, to accurately distinguish a preamble and a RACH resource that correspond to the received RAR.

In a feasible implementation, a feasible implementation of S202 and S203 is as follows: The terminal or the network device determines the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

In some embodiments, an implementation solution of the foregoing implementation is as follows: The terminal or the network device determines the scramble value of the first RAR according to Formula 1, where Formula 1 is as follows:

$$\text{RA-RNTI} = 1 + i + N_{frame} \times f\_id + F_{max} \times N_{frame}(\text{SFN\_id mod}(W_{max}/N_{frame}))$$

where RA-RNTI is the scramble value of the first RAR, i represents the index number of the first time unit corresponding to the first time domain resource of the current system parameter, $N_{frame}$ represents the quantity of time units included in a system frame of the current system parameter, $F_{max}$ is the maximum quantity of candidate frequency domain resources that are in one of the time units and that are of the first preamble, f_id represents an index number of the frequency domain resource corresponding to the first frequency domain resource, SFN_id represents the index number of the first system frame in which the first time domain resource is located, and $W_{max}$ represents the maximum time window length.

It should be noted that the current system parameter is a system parameter used when the terminal sends the first preamble to the network device. When the terminal sends a plurality of preambles to the network device, the terminal may use different system parameters or may use a same system parameter. If the terminal uses different system parameters to send the preambles to the network device, when the terminal determines a scramble value of an RAR corresponding to each preamble, $N_{frame}$ represents a quantity of time units in a system frame of a current system parameter. The current system parameter is a system parameter used for sending the preamble. Values of $N_{frame}$ vary with different system parameters.

$F_{max}$ may be a predefined parameter related to a RACH candidate frequency domain resource. For example, $F_{max}$ is a maximum quantity of candidate frequency domain resources that are in one of the time units and that are of the first preamble. However, this embodiment is not limited thereto. For example, when a value of $F_{max}$ is 6, Formula 1 is represented as follows:

$$\text{RA-RNTI} = 1 + i + N_{frame} \times f\_id + 6 \times N_{frame}(\text{SFN\_id mod}(W_{max}/N_{frame})).$$

In another feasible implementation, a feasible implementation of S202 and S203 is as follows: The terminal or the network device determines the scramble value of the first RAR according to at least one of the following: an index number of the $i^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

In some embodiments, an implementation solution of the foregoing implementation is as follows: The terminal or the network device determines the scramble value of the first RAR according to Formula 2, where Formula 2 is as follows:

$$\text{RA-RNTI} = 1 + i + S_{reference} \times N_{scs}/N_{reference} \times f\_id + F_{max} \times S_{reference}(\text{SFN\_id mod}(W_{max}/N_{frame}))$$

where RA-RNTI is the scramble value of the first RAR, i represents the index number of the first time unit corresponding to the first time domain resource of the current system parameter, $S_{reference}$ represents the quantity of time units included in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

For example, the subcarrier spacing value is 15 kHz, 30 kHz, 60 kHz, 120 kHz, or the like. Optionally, the subcarrier spacing value may be another value less than 15, for example, 1.25 kHz, 5 kHz, or 7.5 kHz. This is not specifically limited herein. For the current system parameter, refer to the descriptions in the foregoing embodiment. Details are not described herein again. The reference system parameter may be any one of the plurality of system parameters. To be specific, a system parameter is selected and used for reference. Because the reference system parameter is predefined, the reference system parameter does not change even if the current system parameter changes.

Figure 3:
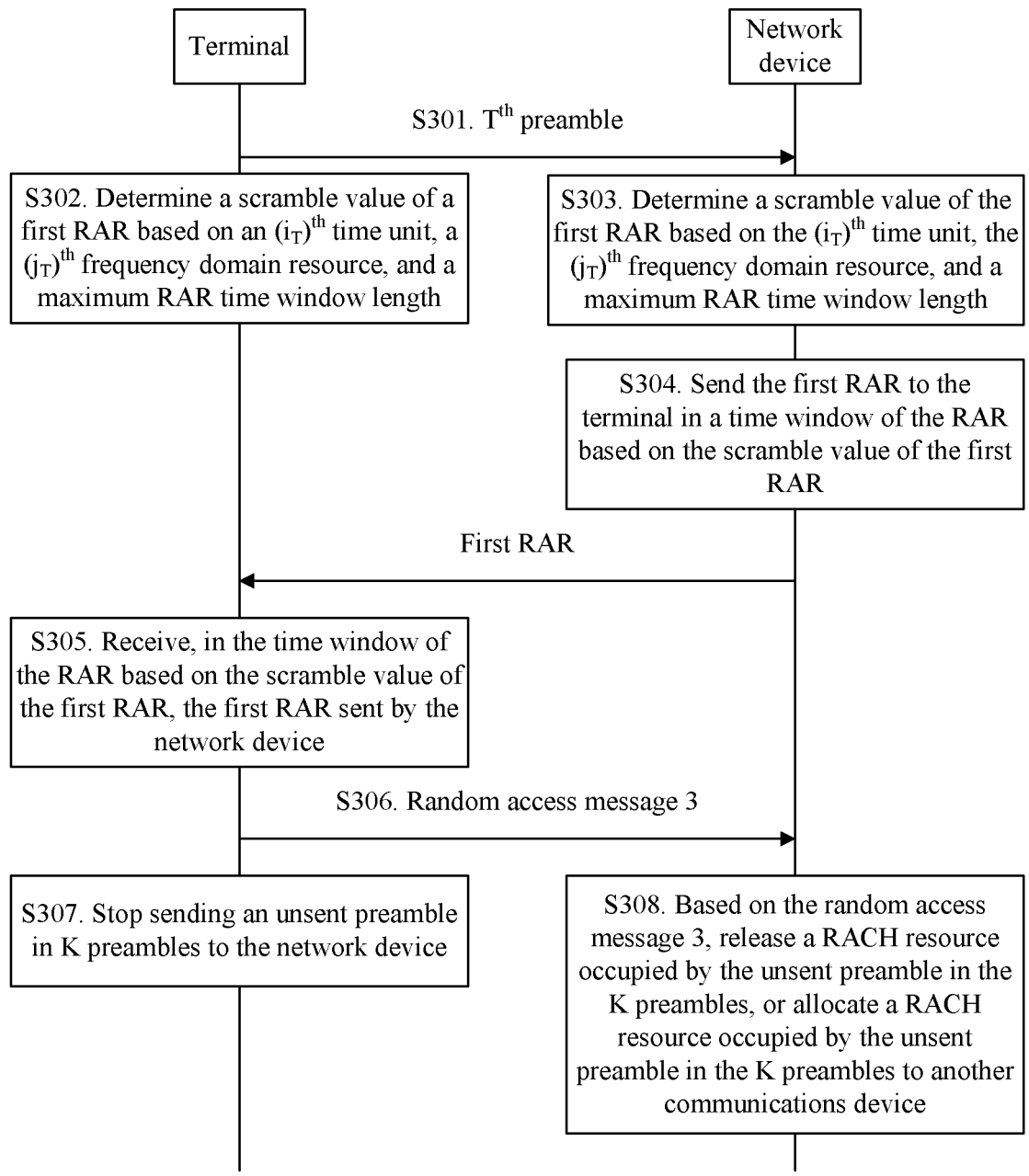
FIG. 3 is a flowchart of a communication method according to another embodiment of this application.

FIG. 3 is a flowchart of a communication method according to another embodiment of this application. As shown in FIG. 3, the method in this embodiment may include the following steps.

S301. A terminal sends a $T^{th}$ preamble to a network device.

In this embodiment, the terminal needs to send K preambles to the network device. In this embodiment, sending the $T^{th}$ preamble is used as an example. The $T^{th}$ preamble is any preamble in the K preambles, where $1 \leq T \leq K$. In addition, an index number of a first time unit of the $T^{th}$ preamble is $i_T$, and the $T^{th}$ preamble occupies a $(j_T)^{th}$ frequency domain resource. A value of $i_T$ varies with a value of T. In other words, a first time unit of a time domain resource occupied by each preamble varies.

S302. The terminal determines a scramble value of a first RAR according to the $(i_T)^{th}$ time unit, the $(j_T)^{th}$ frequency domain resource, and a maximum RAR time window length.

Herein, $i_T$ is the index number of the first time unit of the $T^{th}$ preamble, $j_T$ is an index number of the frequency domain resource occupied by the $T^{th}$ preamble, the maximum RAR time window length includes M time units, and M equals to an integer multiple of a quantity of time units in a system frame of each system parameter in a plurality of system parameters (for example, also referred to as a plurality of pieces of numerology) of the terminal and the network device.

S303. The network device determines a scramble value of the first RAR according to the $(i_T)^{th}$ time unit, the $(j_T)^{th}$ frequency domain resource, and a maximum RAR time window length.

The first RAR is an RAR corresponding to the $T^{th}$ preamble. For specific implementation processes of S302 and S303, refer to related descriptions in the foregoing embodiment. Details are not described herein again.

S304. The network device sends the first RAR to the terminal in a time window of the RAR according to the scramble value of the first RAR.

S305. The terminal receives, in the time window of the RAR according to the scramble value of the first RAR, the first RAR from the network device.

For specific implementation processes of S304 and S305 in this embodiment, refer to related descriptions in the foregoing embodiment. Details are not described herein again.

In some embodiments, a start time unit of the time window of the RAR is related to an index number $i_1$ of a first time unit (namely, an $i_1^{th}$ time unit) corresponding to a first preamble in the preambles. In this embodiment, after a length of the time window of the RAR is obtained, the start time unit and an end time unit of the time window of the RAR need to be determined, so as to determine the time window of the RAR. Therefore, in this embodiment, after the start time unit is determined, the end time unit can be determined according to the length of the time window, so as to determine the time window of the RAR. Then, the RAR is received in the time window of the RAR. In the prior art, a terminal needs to send all the K preambles before receiving an RAR. In other words, a start time unit of a time window of the RAR in the prior art is after a time unit at which a $K^{th}$ preamble is sent, increasing a delay in receiving the RAR by the terminal. Therefore, in this embodiment, the start time unit of the time window of the RAR is set to be related to the index number $i_1$ of the first time unit (namely, the $i_1^{th}$ time unit) corresponding to the first preamble. For example, a first downlink time unit that is three or more time units after the $i_1^{th}$ time unit corresponding to the first preamble is used as the start time unit of the time window of the RAR. Therefore, in this embodiment, there is no need to wait for the terminal to send all the K preambles before receiving the RAR. The terminal can receive the RAR after sending the first preamble, thereby reducing a delay in receiving the RAR by the terminal.

In some embodiments, an end time unit of the time window of the RAR is related to an index number $i_K$ of a first time unit (namely, an $(i_K)^{th}$ time unit) corresponding to a $K^{th}$ preamble in the preambles. In this embodiment, after a length of the time window of the RAR is obtained, a start time unit of the time window of the RAR needs to be determined, so as to determine the time window of the RAR. Therefore, in this embodiment, after the end time unit is determined, the start time unit can be determined according to the length of the time window, so as to determine the time window of the RAR. Then, the RAR is received in the time window of the RAR. In the prior art, a terminal needs to send all the K preambles before receiving an RAR. In other words, a start time unit of a time window of the RAR in the prior art is after a time unit at which a $K^{th}$ preamble is sent, increasing a delay in receiving the RAR by the terminal. Therefore, in this embodiment, the end time unit of the time window of the RAR is set to be related to the index number $i_K$ of the first time unit (namely, the $(i_K)^{th}$ time unit) corresponding to the $K^{th}$ preamble. For example, there are several time units between a first downlink time unit and the end time unit of the time window of the RAR, where the first downlink time unit is three or more time units after the $(i_K)^{th}$ time unit corresponding to the $K^{th}$ preamble. In this way, in this embodiment, a time difference between a time when the $K^{th}$ preamble is sent and an end time of the time window of the RAR can be reduced as much as possible, and there is no need to wait for the terminal to send all the K preambles before receiving the RAR. The terminal can receive the RAR after sending the first preamble, thereby reducing a delay in receiving the RAR by the terminal.

Figure 4:
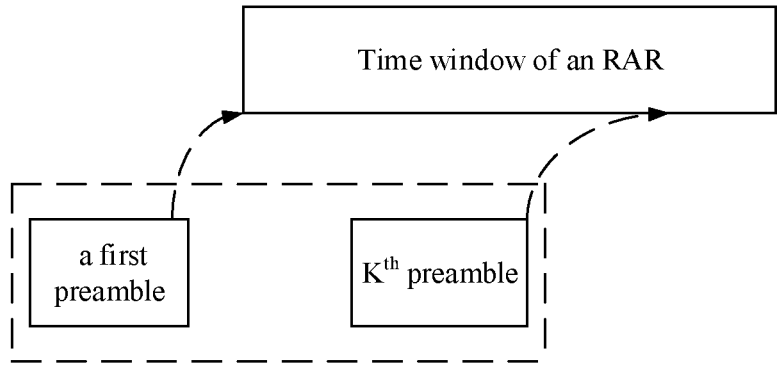
FIG. 4 is a schematic diagram of a time window of an RAR according to an embodiment of this application.

For example, the time window of the RAR in this embodiment is shown in FIG. 4.

S306. The terminal sends a random access message 3 to the network device. The network device receives the random access message 3 from the terminal.

In this embodiment, if the terminal successfully receives the first RAR according to the scramble value of the first RAR, to be specific, successfully receives the RAR corresponding to the $T^{th}$ preamble, the terminal sends the random access message 3 to the network device. Correspondingly, the network device receives the random access message 3 from the terminal. The random access message 3 is a response message in a third step of a random access procedure or a response message to an RAR.

S307. The terminal stops sending unsent preambles in the K preambles to the network device.

In this embodiment, the terminal needs to send the K preambles to the network device, so as to improve a random access success rate, to be specific, to improve an RAR receiving success rate. Because the terminal has received the RAR of the $T^{th}$ preamble, the terminal does not need to send the unsent preamble in the K preambles to the network device. Then, the terminal stops sending the unsent preamble in the K preambles to the network device.

S308. According to the random access message 3, the network device releases a RACH resource occupied by the unsent preamble in the K preambles, or allocates a RACH resource occupied by the unsent preamble in the K preambles to another communications device. The RACH resource herein may include at least one of a time domain resource, a frequency domain resource, and a code domain resource.

In this embodiment, after receiving the random access message 3, the network device determines that the terminal has successfully received the RAR. Therefore, the terminal does not send the unsent preamble in the K preambles to the network device; and a time domain resource, a frequency domain resource, and a code domain resource that are occupied by the unsent preamble do not need to be allocated to the terminal. Therefore, the network device releases the time domain resource, the frequency domain resource, and the code domain resource that are occupied by the unsent preamble in the K preambles, or the network device allocates the time domain resource, the frequency domain resource, and the code domain resource that are occupied by the unsent preamble in the K preambles to another communications device (for example, another terminal). Therefore, this embodiment can reduce resource occupation of the preambles, and improve random access resource utilization.

It may be understood that in the foregoing embodiments, the methods or steps that are implemented by the terminal may be alternatively implemented by a chip in the terminal; and the methods or steps that are implemented by a base station, for example, the network device, may be alternatively implemented by a chip in the network device.

Figure 5:
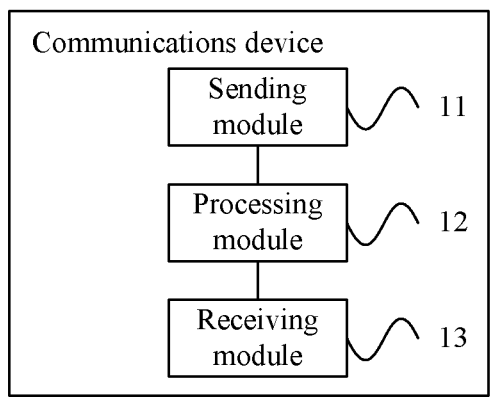
FIG. 5 is a schematic structural diagram of a communications device according to an embodiment of this application.

FIG. 5 is a schematic structural diagram of a communications device according to an embodiment of this application. The communications device in this embodiment is used as a first communications device. The first communications device may be a terminal, or may be a chip in a terminal. As shown in FIG. 5, the communications device may include a sending module 11, a processing module 12, and a receiving module 13.

The sending module 11 is configured to send a first preamble to a second communications device, where the first preamble occupies a first time domain resource and a first frequency domain resource, and a first time unit corresponding to the first time domain resource is an $i^{th}$ time unit.

The processing module 12 is configured to determine a scramble value of a first RAR according to the $i^{th}$ time unit, the first frequency domain resource, and a maximum RAR time window length, where the first RAR is an RAR corresponding to the first preamble, the maximum time window length includes M time units, and M equals to an integer multiple of a quantity of time units in a system frame of each system parameter in a plurality of system parameters for communication between the first communications device and the second communications device.

The receiving module 13 is configured to receive, in a time window of the RAR according to the scramble value of the first RAR, the first RAR from the second communications device, where a length of the time window of the RAR is less than or equal to the maximum time window length.

Optionally, the receiving module 13 is further configured to receive information from the second communications device about the length of the time window of the RAR.

Optionally, the time unit is a time interval for data transmission between the first communications device and the second communications device or a slot.

Optionally, the processing module 12 is specifically configured to determine the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

Optionally, the processing module 12 is specifically configured to determine the scramble value of the first RAR according to Formula 1, where
Formula 1 is as follows:

$$\text{RA-RNTI}=1+i+N_{frame}\times f\_id+F_{max}\times N_{frame}(\text{SFN\_id} \bmod(W_{max}/N_{frame}))$$

where RA-RNTI is the scramble value of the first RAR, i represents the index number of the first time unit corresponding to the first time domain resource of the current system parameter, $N_{frame}$ represents the quantity of time units included in a system frame of the current system parameter, $F_{max}$ is the maximum quantity of candidate frequency domain resources that are in one of the time units and that are of the first preamble, f_id represents an index number of a candidate frequency domain resource corresponding to the first frequency domain resource, SFN_id represents the index number of the first system frame in which the first time domain resource is located, and $W_{max}$ represents the maximum time window length.

Optionally, the processing module 12 is specifically configured to determine the scramble value of the first RAR according to at least one of the following: an index number of the $i^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

Optionally, the processing module 12 is specifically configured to determine the scramble value of the first RAR according to Formula 2, where
Formula 2 is as follows:

$$\text{RA-RNTI}=1+i+S_{reference}\times N_{scs}/N_{reference}\times f\_id+F_{max}\times S_{reference}(\text{SFN\_id} \bmod(W_{max}/N_{frame}))$$

where RA-RNTI is the scramble value of the first RAR, i represents the index number of the first time unit corresponding to the first time domain resource of the current system parameter, $S_{reference}$ represents the quantity of time units included in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

Optionally, the first preamble is any one of K preambles that need to be sent by the first communications device to the second communications device, where the first preamble is a $T^{th}$ preamble in the preambles, and $1 \leq T \leq K$; and the index number of the first time unit corresponding to the first time domain resource is $i_T$, where a value of $i_T$ varies with a value of T, and the first frequency domain resource is a $(j_T)^{th}$ frequency domain resource; and a start time unit of the time window of the RAR is related to an index number $i_1$ of a first time unit corresponding to a first preamble in the preambles; and/or an end time unit of the time window of the RAR is related to an index number $i_K$ of a first time unit corresponding to a $K^{th}$ preamble in the preambles.

Optionally, the sending module 11 is further configured to: if the receiving module successfully receives the first RAR according to the scramble value of the first RAR, send a random access message 3 to the second communications device, and stop sending unsent preambles in the K preambles to the second communications device.

The first communications device described above in this embodiment may be configured to perform technical solutions performed by the terminal or terminal chip in the foregoing method embodiments. Implementation principles and technical effects of the first communications device are similar to those in the method embodiments. For a function of each module of the first communications device, refer to corresponding descriptions in the method embodiments. Details are not described herein again.

Figure 6:
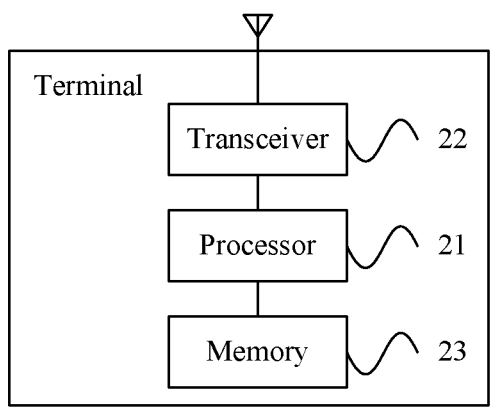
FIG. 6 is a schematic structural diagram of a terminal according to an embodiment of this application.

FIG. 6 is a schematic structural diagram of a terminal according to an embodiment of this application. As shown in FIG. 6, the terminal in this embodiment may include a processor 21 and a transceiver 22. The processor 21 is connected to and communicates with the transceiver 22.

In hardware implementation, the sending module 11 and the receiving module 13 may be the transceiver 22 in this embodiment. Alternatively, the transceiver 22 includes a transmitter and a receiver, the sending module 11 may be a transmitter in the transceiver 22, and the receiving module 13 may be a receiver in the transceiver 22. The processing module 12 may be embedded in or independent of the processor 21 in the terminal in a form of hardware.

The transceiver 22 may include a necessary radio-frequency communications device, for example, a frequency mixer. The processor 21 may include at least one of a central processing unit (Central Processing Unit, CPU), a digital signal processor (digital signal processor, DSP), a microcontroller unit (Microcontroller Unit, MCU), and an application-specific integrated circuit (Application-Specific Integrated Circuit, ASIC), or a field-programmable gate array (Field-programmable Gate Array, FPGA).

Optionally, the terminal in this embodiment may further include a memory 23. The memory 23 is configured to store a program instruction. The processor 21 is configured to invoke the program instruction in the memory 23, to perform the foregoing solutions.

The program instruction may be implemented in a form of a software function unit and can be sold or used as an independent product. The memory 23 may be a computer readable storage medium in any form. According to such an understanding, all or some of the technical solutions of this application may be implemented in a form of a software product. The software product includes several instructions for instructing a computer device, which may be specifically the processor 21, to perform all or some of the steps of the terminal in the embodiments of this application. The foregoing computer readable storage medium includes any medium that can store program code, such as a USB flash drive, a removable hard disk, a read-only memory (Read-Only Memory, ROM), a random access memory (Random Access Memory, RAM), a magnetic disk, or an optical disc.

The terminal described above in this embodiment may be configured to perform technical solutions performed by the terminal or a chip in the terminal in the foregoing method embodiments of this application. Implementation principles and technical effects of the terminal are similar to those in the method embodiments. For a function of each module of the terminal, refer to corresponding descriptions in the method embodiments. Details are not described herein again.

Figure 7:
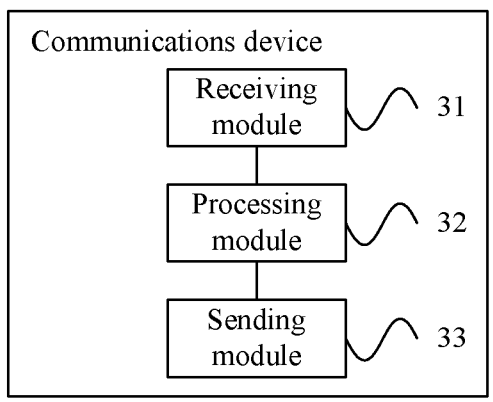
FIG. 7 is a schematic structural diagram of a communications device according to another embodiment of this application.

FIG. 7 is a schematic structural diagram of a communications device according to another embodiment of this application. The communications device in this embodiment is used as a second communications device. The second communications device may be a network device, or may be a chip in a network device. As shown in FIG. 7, the communications device may include a receiving module 31, a processing module 32, and a sending module 33.

The receiving module 31 is configured to receive a first preamble from a first communications device, where the first preamble occupies a first time domain resource and a first frequency domain resource, and a first time unit corresponding to the first time domain resource is an $i^{th}$ time unit.

The processing module 32 is configured to determine a scramble value of a first RAR according to the $i^{th}$ time unit, the first frequency domain resource, and a maximum RAR time window length, where the first RAR is an RAR corresponding to the first preamble, the maximum time window length includes M time units, and M equals to an integer multiple of a quantity of time units in a system frame of each system parameter in a plurality of system parameters for communication between the first communications device and the second communications device.

The sending module 33 is configured to send the first RAR to the first communications device in a time window of the RAR according to the scramble value of the first RAR, where a length of the time window of the RAR is less than or equal to the maximum time window length.

Optionally, the sending module 33 is further configured to send information about the length of the time window of the RAR to the first communications device.

Optionally, the time unit is a time interval for data transmission between the first communications device and the second communications device or a slot.

Optionally, the processing module 32 is specifically configured to determine the scramble value of the first RAR according to at least one of the following: an index number of the $i^{th}$ time unit, the first frequency domain resource, the maximum time window length, a quantity of time units in a system frame of a current system parameter, a maximum quantity of candidate frequency domain resources that are in one of the time units and that are of the first preamble, and an index number of a first system frame in which the first time domain resource is located.

Optionally, the processing module 32 is specifically configured to determine the scramble value of the first RAR according to Formula 1, where Formula 1 is as follows:

$$\text{RA-RNTI}=1+i+N_{frame} \times f\_id + F_{max} \times N_{frame}(\text{SFN\_id} \mod(W_{max}/N_{frame}))$$

where RA-RNTI is the scramble value of the first RAR, i represents the index number of the first time unit corresponding to the first time domain resource of the current system parameter, $N_{frame}$ represents the quantity of time units included in a system frame of the current system parameter, $F_{max}$ is the maximum quantity of candidate frequency domain resources that are in one of the time units and that are of the first preamble, f_id represents an index number of a candidate frequency domain resource corresponding to the first frequency domain resource, SFN_id represents the index number of the first system frame in which the first time domain resource is located, and $W_{max}$ represents the maximum time window length.

Optionally, the processing module 32 is specifically configured to determine the scramble value of the first RAR according to at least one of the following: an index number of the $i^{th}$ time unit, the first frequency domain resource, the maximum time window length, a maximum quantity of candidate frequency domain resources that are in one of the time units and that are of the first preamble, a quantity of time units in a system frame of a reference system parameter, a subcarrier spacing value of the reference system parameter, a subcarrier spacing value of a current system parameter, a quantity of time units in a system frame of the current system parameter, and an index number of a first system frame in which the first time domain resource is located.

Optionally, the processing module 32 is specifically configured to determine the scramble value of the first RAR according to Formula 2, where Formula 2 is as follows:

$$\text{RA-RNTI}=1+i+S_{reference} \times N_{scs}/N_{reference} \times f\_id+F_{max} \times S_{reference}(\text{SFN\_id} \bmod(W_{max}/N_{frame}))$$

where RA-RNTI is the scramble value of the first RAR, i represents the index number of the first time unit corresponding to the first time domain resource of the current system parameter, $S_{reference}$ represents the quantity of time units in a system frame of the reference system parameter, $N_{reference}$ represents the subcarrier spacing value of the reference system parameter, $N_{scs}$ represents the subcarrier spacing value of the current system parameter, $N_{frame}$ represents the quantity of time units in a system frame of the current system parameter, f_id represents an index number of a candidate frequency domain resource corresponding to the first frequency domain resource, $F_{max}$ is the maximum quantity of candidate frequency domain resources that are in one of the time units and that are of the first preamble, SFN_id represents the index number of the first system frame in which the first time domain resource is located, and $W_{max}$ represents the maximum time window length.

Optionally, the first preamble is any one of K preambles that need to be sent by the second communications device to the first communications device, where the first preamble is a $T^{th}$ preamble in the preambles, and $1 \le T \le K$; and the index number of the first time unit corresponding to the first time domain resource is $i_T$, where a value $i_T$ varies with a value of T, and the first time domain resource is a $(j_T)^{th}$ frequency domain resource; and a start time unit of the time window of the RAR is related to an index number $i_1$ of a first time unit corresponding to a first preamble in the preambles; and/or an end time unit of the time window of the RAR is related to an index number $i_K$ of a first time unit corresponding to a $K^{th}$ preamble in the preambles.

Optionally, the receiving module 31 is further configured to receive a random access message 3 from the first communications device.

The processing module 32 is further configured to: according to the random access message 3, release a random access resource occupied by unsent preambles in the K preambles, or allocate a random access resource occupied by unsent preambles in the K preambles to another communications device.

The second communications device described above in this embodiment may be configured to perform technical solutions performed by the network device or a chip in the network device in the foregoing method embodiments. Implementation principles and technical effects of the second communications device are similar to those in the method embodiments. For a function of each module of the second communications device, refer to corresponding descriptions in the method embodiments. Details are not described herein again.

Figure 8:
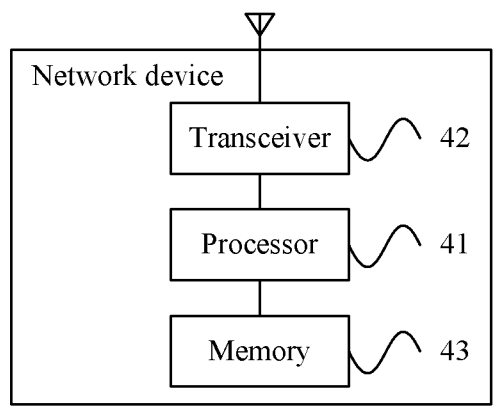
FIG. 8 is a schematic structural diagram of a network device according to an embodiment of this application.

FIG. 8 is a schematic structural diagram of a network device according to an embodiment of this application. As shown in FIG. 8, the network device in this embodiment may include a processor 41 and a transceiver 42. The processor 41 is connected to and communicates with the transceiver 42.

In hardware implementation, the receiving module 31 and the sending module 33 may be the transceiver 42 in this embodiment. Alternatively, the transceiver 42 includes a transmitter and a receiver, the receiving module 31 may be the receiver in the transceiver 42, and the sending module 33 may be the transmitter in the transceiver 42. The processing module 32 may be embedded in or independent of the processor 41 in the network device in a form of hardware.

The transceiver 42 may include a necessary radio-frequency communications device, for example, a frequency mixer. The processor 41 may include at least one of a CPU, a DSP, an MCU, an ASIC, or an FPGA.

Optionally, the network device in this embodiment may further include a memory 43. The memory 43 is configured to store a program instruction. The processor 41 is configured to invoke the program instruction in the memory 43, to perform the foregoing solutions.

The program instruction may be implemented in a form of a software function unit and can be sold or used as an independent product. The memory 43 may be a computer readable storage medium in any form. According to such an understanding, all or some of the technical solutions of this application may be implemented in a form of a software product. The software product includes several instructions for instructing a computer device, which may be specifically the processor 41, to perform all or some of the steps of the network device in the embodiments of this application. The foregoing computer readable storage medium includes any medium that can store program code, such as a USB flash drive, a removable hard disk, a ROM, a RAM, a magnetic disk, or an optical disc.

The network device described above in this embodiment may be configured to perform the technical solutions of the network device in the foregoing method embodiments of this application. Implementation principles and technical effects are similar to those in the method embodiments. Details are not described herein again.

It should be noted that the division of modules in the embodiments of this application is an example, and is merely logical function division, and there may be another division manner in actual implementation. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in a form of a software function module and sold or used as an independent product, the integrated unit may be stored in a computer readable storage medium. According to such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all of the processes or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A communication method, comprising:
    sending, by a first communications device, a first preamble to a second communications device, wherein the first preamble occupies a first time domain resource and a first frequency domain resource, and a first time unit corresponding to the first time domain resource is a time unit which has an index number i in a system frame;
    determining, by the first communications device, a scramble value of a first random access response (RAR) according to information of the time unit which has an index number i, information of the first frequency domain resource, and a quantity M of time units, wherein the first RAR is an RAR corresponding to the first preamble, and M equals to an integer multiple of a quantity of time units in a system frame of each system parameter in a plurality of system parameters for communication between the first communications device and the second communications device; and
    receiving, by the first communications device in a time window of the first RAR according to the scramble value of the first RAR, the first RAR from the second communications device, wherein a length of the time window of the first RAR is less than or equal to M time units.

2. The method according to claim 1, further comprising:
    receiving, by the first communications device, information from the second communications device about the length of the time window of the first RAR.

3. The method according to claim 1, wherein the time unit is a time interval for data transmission between the first communications device and the second communications device or a slot.

4. The method according to claim 1, wherein the determining, by the first communications device, a scramble value of a first RAR according to information of the time unit which has an index number i, information of the first frequency domain resource, and a quantity M of time units comprises:
    determining, by the first communications device, the scramble value of the first RAR according to at least one of the following: the index number i of the time unit, the information of the first frequency domain resource, the quantity M of time units, a quantity of time units in a system frame of a current system parameter, a maximum quantity of candidate frequency domain resources that are in one of the time units and that are of the first preamble, or an index number of a first system frame in which the first time domain resource is located.

5. The method according to claim 1, wherein the first preamble is any one of K preambles that need to be sent by the first communications device to the second communications device, the first preamble is a $T^{th}$ preamble in the preambles, and $1 \le T \le K$; and the index number of the first time unit corresponding to the first time domain resource is $i_T$, a value of $i_T$ varies with a value of T, and the first frequency domain resource is a $(j_T)^{th}$ frequency domain resource;
    a start time unit of the time window of the first RAR is related to an index number $i_1$ of a first time unit corresponding to a first preamble in the preambles; and
    an end time unit of the time window of the first RAR is related to an index number $i_K$ of a first time unit corresponding to a $K^{th}$ preamble in the preambles.

6. The method according to claim 1, further comprising:
    receiving, by the first communications device, the first RAR according to the scramble value of the first RAR, and sending a random access message 3 to the second communications device.

7. The method according to claim 1, further comprising:
    receiving, by the first communications device, the first RAR according to the scramble value of the first RAR, and not sending unsent preambles in the K preambles to the second communications device.

8. The method according to claim 1, wherein a value of M is 80.

9. A communication method, comprising:
    receiving, by a second communications device, a first preamble from a first communications device, the first preamble occupying a first time domain resource and a first frequency domain resource, and a first time unit corresponding to the first time domain resource is a time unit which has an index number i in a system frame;
    determining, by the second communications device, a scramble value of a first random access response (RAR) according to information of the time unit which has an index number i, information of the first frequency domain resource, and a quantity M of time units, the first RAR corresponding to the first preamble, and M equals an integer multiple of a quantity of time units in a system frame of each system parameter in a plurality of system parameters for communication between the first communications device and the second communications device; and sending, by the second communications device, the first RAR to the first communications device in a time window of the first RAR according to the scramble value of the first RAR, wherein a length of the time window of the first RAR is less than or equal to M time units.

10. The method according to claim 9, further comprising:
sending, by the second communications device, information about the length of the time window of the first RAR to the first communications device.

11. The method according to claim 9, wherein the time unit is a time interval for data transmission between the first communications device and the second communications device or a slot.

12. The method according to claim 9, wherein the determining, by the second communications device, a scramble value of a first RAR according to information of the time unit which has an index number i, information of the first frequency domain resource, and a quantity M of time units comprises:
determining, by the second communications device, the scramble value of the first RAR according to at least one of the following: the index number i of the time unit, the information of the first frequency domain resource, the quantity M of time units, a quantity of time units in a system frame of a current system parameter, a maximum quantity of candidate frequency domain resources that are in one of the time units and that are of the first preamble, or an index number of a first system frame in which the first time domain resource is located.

13. The method according to claim 9, wherein the first preamble is any one of K preambles that need to be sent by the second communications device to the first communications device, the first preamble is a $T^{th}$ preamble in the preambles, and $1 \leq T \leq K$; and the index number of the first time unit corresponding to the first time domain resource is $i_T$, a value of $i_T$ varies with a value of T, and the first frequency domain resource is a $(j_T)^{th}$ frequency domain resource;
a start time unit of the time window of the first RAR is related to an index number $i_1$ of a first time unit corresponding to a first preamble in the preambles; and
an end time unit of the time window of the first RAR is related to an index number $i_K$ of a first time unit corresponding to a $K^{th}$ preamble in the preambles.

14. The method according to claim 9, further comprising:
receiving, by the second communications device, a random access message 3 from the first communications device; and
releasing, by the second communications device according to the random access message 3, a random access resource occupied by unsent preambles in the K preambles, or allocating, by the second communications device according to the random access message 3, a random access resource occupied by unsent preambles in the K preambles to another communications device.

15. The method according to claim 9, wherein a value of M is 80.

16. An apparatus, comprising:
a storage medium configured to store program instructions; and
one or more processors in communication with the memory, wherein the one or more processors execute the program instructions to perform operations comprising: sending a first preamble to a second communications device, the first preamble occupying a first time domain resource and a first frequency domain resource, and a first time unit corresponding to the first time domain resource is a time unit which has an index number i in a system frame;
determining a scramble value of a first random access response (RAR) according to information of the time unit which has an index number i, information of the first frequency domain resource, and a quantity M of time units, the first RAR corresponding to the first preamble, and M equals an integer multiple of a quantity of time units in a system frame of each system parameter in a plurality of system parameters for communication between a first communications device and the second communications device; and
receiving the first RAR from the second communications device in a time window of the first RAR according to the scramble value of the first RAR, a length of the time window of the first RAR being less than or equal to M time units.

17. The apparatus according to claim 16, wherein the operations further comprising:
receiving information from the second communications device about the length of the time window of the first RAR.

18. The apparatus according to claim 16, wherein the time unit is a time interval for data transmission between the first communications device and the second communications device or a slot.

19. The apparatus according to claim 16, wherein determining a scramble value of a first random access response (RAR) further comprises:
determining the scramble value of the first RAR according to at least one of the following: the index number i of the time unit, the information of the first frequency domain resource, the quantity M of time units, a quantity of time units in a system frame of a current system parameter, a maximum quantity of candidate frequency domain resources that are in one of the time units and that are of the first preamble, or an index number of a first system frame in which the first time domain resource is located.

20. The apparatus according to claim 16, wherein the first preamble is any one of K preambles that need to be sent by the first communications device to the second communications device, wherein the first preamble is a $T^{th}$ preamble in the preambles, and $1 \leq T \leq K$; and the index number of the first time unit corresponding to the first time domain resource is $i_T$, wherein a value of $i_T$ varies with a value of T, and the first frequency domain resource is a $(j_T)^{th}$ frequency domain resource;
a start time unit of the time window of the first RAR is related to an index number $i_1$ of a first time unit corresponding to a first preamble in the preambles; and
an end time unit of the time window of the first RAR is related to an index number $i_K$ of a first time unit corresponding to a $K^{th}$ preamble in the preambles.

21. The apparatus according to claim 16, wherein a value of M is 80.

* * * * *

UNITED STATES PATENT AND TRADEMARK OFFICE
CERTIFICATE OF CORRECTION

PATENT NO. : 11,178,703 B2
APPLICATION NO. : 16/785018
DATED : November 16, 2021
INVENTOR(S) : Liu It is certified that error appears in the above-identified patent and that said Letters Patent is hereby corrected as shown below:

On the Title Page

Item [71], "HUAWEI TECHNOLOGIES CO., LTD., Guangdong (CN)" should read -- HUAWEI TECHNOLOGIES CO., LTD., Shenzhen (CN) --.

Item [56], Line 1: "St. Julians" should read -- St. Julian's --.

Page 2: item [56], Line 5: "3GPP Draft" should read -- 3GPP TSG-RAN WG2 #98-AH --.

Page 2: item [56], Line 6: "St. Julian s" should read -- St. Julian's --.

Signed and Sealed this
Twenty-first Day of June, 2022

Katherine Kelly Vidal
*Director of the United States Patent and Trademark Office*